US012800083B2

(12) United States Patent
Won et al.

(10) Patent No.: US 12,800,083 B2
(45) Date of Patent: Nov. 17, 2026

(54) PIPING VIBRATION ABSORBER APPARATUS HAVING VIBRATION MONITORING SYSTEM

(71) Applicant: KEPCO ENGINEERING & CONSTRUCTION COMPANY, INC., Gyeongsangbuk-do (KR)

(72) Inventors: Youn Ho Won, Gimcheon-si (KR); Hyeong Wook Kim, Yongin-si (KR); June Suk Yang, Seo-gu (KR)

(73) Assignee: KEPCO ENGINEERING & CONSTRUCTION COMPANY, INC., Gimcheon-si (KR)

( * ) Notice: Subject to any disclaimer, the term of this patent is extended or adjusted under 35 U.S.C. 154(b) by 50 days.

(21) Appl. No.: 18/984,346

(22) Filed: Dec. 17, 2024

(65) Prior Publication Data

US 2025/0207711 A1 Jun. 26, 2025

(30) Foreign Application Priority Data

Dec. 22, 2023 (KR) ........................ 10-2023-0190360

(51) Int. Cl.
*F16L 55/035* (2006.01)
*F16L 55/033* (2006.01)

(52) U.S. Cl.
CPC ......... *F16L 55/035* (2013.01); *F16L 55/0336* (2013.01)

(58) Field of Classification Search
CPC ...... F16L 55/035; F16L 55/0336; F16L 55/02
USPC ........ 248/65, 634, 638, 49, 58, 60, 63, 68.1, 248/70, 73, 74.1, 74.2, 51, 52
See application file for complete search history.

(56) References Cited

U.S. PATENT DOCUMENTS 3,782,670 A * 1/1974 Kielma .................. F16G 13/16 248/51
3,872,881 A * 3/1975 Miller .................. E02F 9/2275 280/421
4,494,634 A 1/1985 Kato
4,942,075 A * 7/1990 Hartel .................... F16F 1/426 428/113

(Continued)

FOREIGN PATENT DOCUMENTS

CN 206608494 U 11/2017
DE 3151983 A1 7/1983

(Continued)

OTHER PUBLICATIONS

Extended European Search Report in EP Patent Application No. 24221610.9, mailed May 26, 2025, (10 pages).

(Continued)

*Primary Examiner* — Terrell L Mckinnon
*Assistant Examiner* — Michael McDuffie
(74) *Attorney, Agent, or Firm* — NIXON PEABODY LLP; Jeffrey L. Costellia

(57) ABSTRACT

Provided is a piping vibration absorber apparatus having a vibration monitoring system including a vibration absorber installed in pipe, the vibration absorber including an elastic plate having one side coupled to the pipe and formed in a cantilever shape; a mass plate installed on the elastic plate and having a specified mass; and a wire damper including a steel wire and coupled to another side of the elastic plate.

16 Claims, 11 Drawing Sheets

(56) References Cited

U.S. PATENT DOCUMENTS 5,444,195 A * 8/1995 Dojo ........................ F16F 3/00 181/208
RE35,579 E * 8/1997 Moritz ..................... F16G 13/16 59/900
6,194,664 B1 * 2/2001 Zamora .................. H02G 11/00 248/51
6,996,967 B2 * 2/2006 Kobayashi ............ E05F 15/646 59/900
7,426,823 B2 * 9/2008 Blase ................... H02G 11/006 248/51
7,600,719 B2 * 10/2009 Wehler .................... F16G 13/16 248/51
7,784,259 B2 * 8/2010 O'Rourke .............. H02G 11/00 59/900
7,975,464 B2 * 7/2011 Komiya ............... H02G 3/0475 248/51
8,544,346 B2 * 10/2013 Peleg ....................... H02K 7/11 73/861.79
8,561,949 B2 * 10/2013 Komiya .................. F16L 3/015 248/68.1
8,950,538 B2 * 2/2015 Kurauchi .................. E02F 9/08 172/813
8,950,714 B2 * 2/2015 Ikeda ................... H01B 7/0823 138/120
8,957,310 B2 * 2/2015 Kaihotsu .................. H02G 3/04 138/155
10,655,699 B2 * 5/2020 Keinänen ................. F16F 7/116
11,406,480 B2 8/2022 Gatzemeyer et al.
2008/0173754 A1 * 7/2008 Strehlow ................. F16F 15/02 244/17.13
2012/0267164 A1 * 10/2012 Reuss .................. H02G 3/0487 248/74.2
2013/0075128 A1 * 3/2013 Kaihotsu .............. H02G 11/006 174/68.3
2014/0042280 A1 * 2/2014 Takeuchi ............. H02G 3/0475 248/49
2014/0262656 A1 9/2014 Song et al.
2016/0076670 A1 * 3/2016 Takeuchi ................ F16G 13/16 248/70
2016/0178088 A1 * 6/2016 Stadler .................... F16L 3/015 248/68.1
2023/0313499 A1 * 10/2023 Tiezzi ..................... F16G 13/06 248/68.1

FOREIGN PATENT DOCUMENTS

JP S6285643 U 6/1987
KR 20210089786 A 7/2021
KR 102517164 B1 4/2023
WO 2020-170003 A1 8/2020

OTHER PUBLICATIONS

Korean Office Action in Patent Application No. 10-2023-0190360 with English Translation, mailed May 22, 2025 (20 pages).

* cited by examiner

PIPING VIBRATION ABSORBER APPARATUS HAVING VIBRATION MONITORING SYSTEM

CROSS-REFERENCE TO RELATED APPLICATION

This application is based on and claims priority under 35 U.S.C. § 119 to Korean Patent Application No. 10-2023-0190360, filed on Dec. 22, 2023, in the Korean Intellectual Property Office, the disclosure of which is incorporated by reference herein in its entirety.

BACKGROUND

1. Field

The disclosure relates to a piping vibration absorber apparatus having a vibration monitoring system, and more specifically, to a piping vibration absorber apparatus having a vibration monitoring system so that the piping vibration absorber apparatus may reduce piping vibrations using an elastic plate and a mass plate, absorb vibration energy and shock using a wire damper, absorb vibration energy through a vibration damping material and the curvature of the elastic plate, and supply power to a vibration sensor through its own energy harvesting without external power supply such that the states of piping vibrations may be remotely monitored by the vibration monitoring system.

2. Description of the Related Art

Vibrations inevitably occur in a power plant piping with fluid flow. Piping vibrations may be caused by pressure pulsation of fluid equipment, vortex by discontinuous shape, turbulence flow, cavitation, water hammer, steam hammer, etc.

If the vibration level of the power plant piping is high, fatigue damage may be caused to welded joints, branch connections, etc, where stress is concentrated, and depending on the degree of damage, the output of the power plant may be reduced or the operation of the power plant may be stopped for repairs. Therefore, high vibration of the piping may be a cause of hindering the normal operation and safety of the power plant. In addition, since it takes time to operate normally, such as analyzing the root cause and establishing improvement measures, there is also a big problem with sales loss due to suspension of the operation of the power plant.

In order to prevent damage to the piping caused by vibrations in the power plant piping, it is necessary to accurately predict the vibration load during the operation of the piping. However, it is practically difficult to accurately predict such vibration load at the design stage.

In the past, the soundness of a piping was confirmed by observing and evaluating the effects of vibrations during startup operations or normal operations, and when high vibration was confirmed, a corrective action was taken to reduce the piping vibrations.

A corrective action may be taken by adding rigid supports or damper supports to the piping. However, since such corrective actions require the installation of pipe supports using structures outside the piping and the re-performance of piping stress analysis to evaluate the soundness of the piping, it is difficult to add pipe supports to a power plant of which construction has been completed and is in startup operations or commercial operations.

To solve this problem, a dynamic vibration absorber has been considered. Piping vibrations may be reduced by installing the dynamic vibration absorber directly in pipe without adding a pipe support using an external structure.

The dynamic vibration absorber may adjust the natural frequency to match the vibration frequency of the piping, and through this, the vibration of the piping and the vibration of the dynamic vibration absorber are in reverse phase, thereby reducing the vibration of the piping by increasing the vibration of the dynamic vibration absorber. In particular, when the piping vibrates at a single frequency component, adjusting the stiffness and mass of the dynamic vibration absorber may completely reduce piping vibration.

However, the conventional dynamic vibration absorber does not have a damping function to prevent fatigue damage and absorb vibration energy, and a shock absorption function to prevent excessive displacement due to impact load from damaging the dynamic vibration absorber.

In addition, conventional dynamic vibration absorbers do not have a vibration monitoring system that may remotely monitor vibration through its own energy harvesting without external power supply, making it difficult to check the vibration trend in real time.

SUMMARY

Provided is a piping vibration absorber apparatus having a vibration monitoring system so that the piping vibration absorber apparatus may reduce piping vibration using an elastic plate and a mass plate, absorb vibration energy and shock using a wire damper, absorb vibration energy through a vibration damping material and the curvature of the elastic plate, and supply power to a vibration sensor through its own energy harvesting without external power supply such that the state piping vibrations may be remotely monitored by the vibration monitoring system.

Additional aspects will be set forth in part in the description which follows and, in part, will be apparent from the description, or may be learned by practice of the presented embodiments of the disclosure.

According to an aspect of the disclosure, a piping vibration absorber apparatus having a vibration monitoring system to reduce vibration occurring in piping includes a vibration absorber installed in the pipe, wherein the vibration absorber includes an elastic plate having one side coupled to the pipe and formed in a cantilever shape, a mass plate installed on the elastic plate and having a specified mass, and a wire damper including a steel wire and coupled to another side of the elastic plate.

According to an embodiment, the piping vibration absorber apparatus having a vibration monitoring system may include a first clamp and a second clamp coupled to the pipe, wherein the one side of the elastic plate may be coupled to the first clamp, and the wire damper may be coupled to the second clamp.

According to an embodiment, the first clamp may include a first saddle to which the one side of the elastic plate is fixed, and the second clamp may include a second saddle to which the steel wire of the wire damper is fixed.

According to an embodiment, the second saddle is provided with a wire fixing unit for fixing the steel wire, and a length of the steel wire extending from the wire fixing unit to the other side of the elastic plate may be adjusted by adjusting a position where the steel wire is fixed to the wire fixing unit.

According to an embodiment, the steel wire may be formed in a U-shape and may be coupled to the other side of the elastic plate and the wire fixing unit.

According to an embodiment, the elastic plate may include a fixing part coupled to the first clamp, a second flat plate part extending from the fixing part and formed in a flat plate shape, a first flat plate part to which the wire damper is coupled and formed in a flat plate shape, and a curvature part connecting the second flat plate part with the first flat plate part and extending while forming a curvature.

According to an embodiment, the curvature part may include a first curvature part extending while forming a first curvature, a second curvature part extending while forming a second curvature, and a connection part connecting the first curvature part with the second curvature part.

According to an embodiment, the vibration absorber may include a reinforcing plate connecting the lower part of the second flat plate part to the first clamp, wherein the reinforcing plate may be formed in a curved shape.

According to an embodiment, the vibration absorber may include a plurality of the elastic plates, and the vibration absorber may include a vibration damping material provided in at least one of between the plurality of the elastic plates, on the upper portions of the elastic plates, and on the lower portions of the elastic plates.

According to an embodiment, the vibration damping material may be provided between the plurality of first flat plate parts, the second flat plate parts, and the curvature parts and a spacer having the same thickness as the vibration damping material and higher strength than the vibration damping material may be provided between the plurality of fixing parts.

According to an embodiment, the vibration absorber is provided with a plurality of the mass plates, wherein the plurality of the mass plates may be stacked on the elastic plate.

According to an embodiment, the vibration absorber includes an eye bolt and a nut for installing the mass plate on the elastic plate, wherein the eye bolt may be provided with a ring.

According to an embodiment, the vibration absorber includes an eye bolt and a nut for installing the mass plate on the elastic plate, the elastic plate has a slot extending in the longitudinal direction, and the eye bolt may pass through the mass plate and be inserted into the slot.

According to an embodiment, the vibration absorber may include a vibration sensor installed on the elastic plate to measure the vibration of the pipe, and a piezoelectric element installed on the elastic plate and connected to the vibration sensor to supply power to the vibration sensor.

According to an embodiment, the piping vibration absorber apparatus may include a monitoring unit capable of receiving data from the vibration sensor.

According to an embodiment, the piping vibration absorber apparatus may include a plurality of vibration absorbers.

According to an embodiment, the plurality of vibration absorbers may be arranged side by side around the pipe.

According to an embodiment, the plurality of vibration absorbers may be arranged on an upper portion and a lower portion of the pipe around the pipe.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
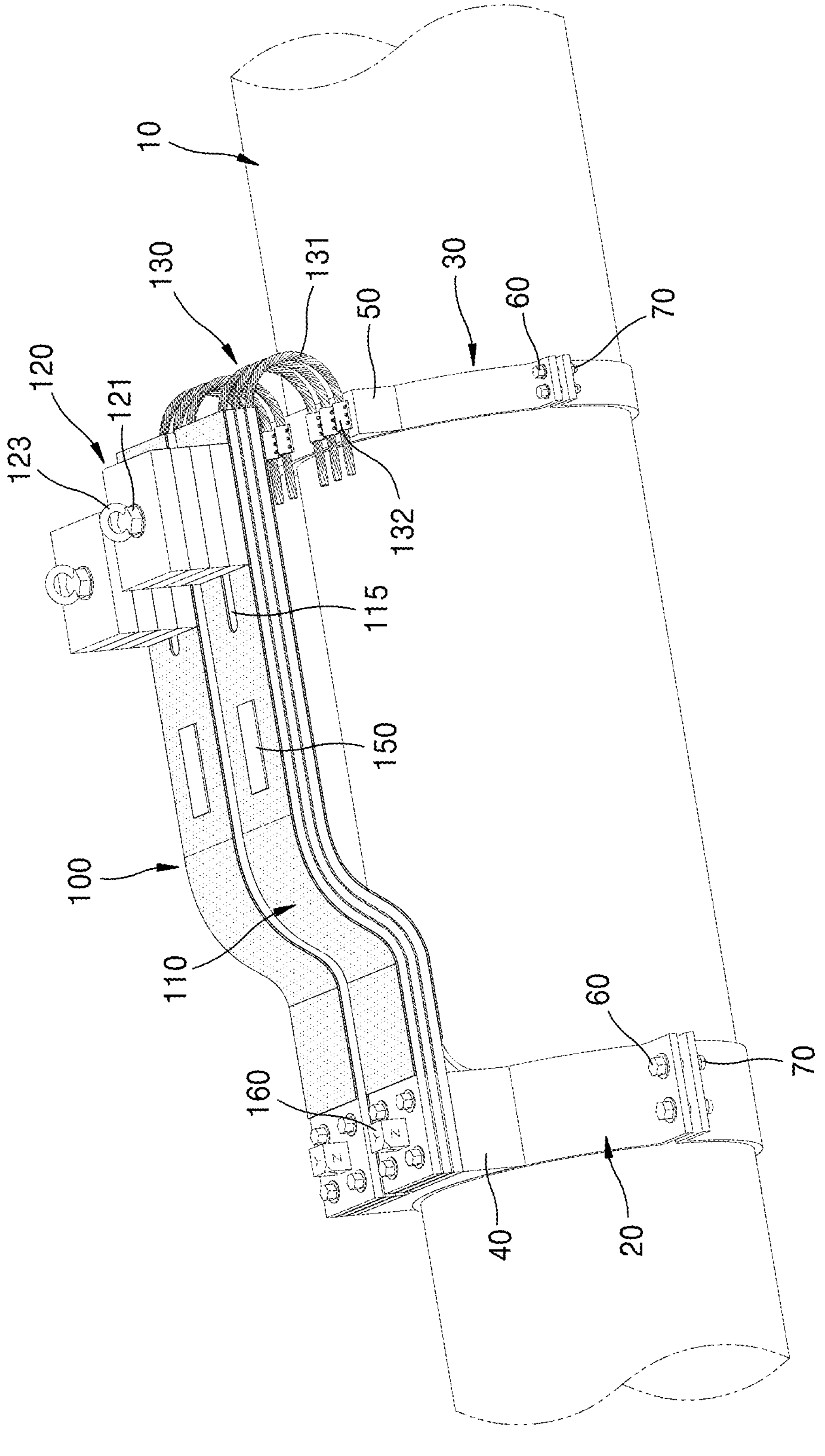
FIG. 1 is a perspective view of a piping vibration absorber apparatus having a vibration monitoring system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term “and/or” includes any and all combinations of one or more of the associated listed items. Expressions such as “at least one of,” when preceding a list of elements, modify the entire list of elements and do not modify the individual elements of the list.

The disclosure will be described more fully hereinafter with reference to the accompanying drawings, in which embodiments according to the inventive concept are shown, and the principle of the inventive concept is described so that the embodiments may be practiced by those skilled in the art. The disclosed embodiments may be implemented in various forms.

Expressions such as “including” or “may include” that may be used in various embodiments of the inventive concept indicate the existence of a corresponding function, operation, component, or the like that is disclosed, and do not limit one or more additional functions, operations, components, or the like. In addition, in various embodiments according to the inventive concept, terms such as “comprises,” “has,” or “consists of” are intended to refer to the presence of features, numbers, steps, operations, components, parts, or combinations thereof described in the specification, but it should be understood that the terms do not preclude the existence or addition of one or more other features, numbers, steps, operations, components, parts, or combinations thereof.

When it is said that a component is "connected and coupled" to another component, it should be understood that said component may be directly connected or coupled to said other component, but that there may also be new other components between said component and said other component. In addition, when it is said that a component is "directly connected" or "directly coupled" to another component, it should be understood that no new component exists between said component and said other component.

The terms first, second, etc. used in the disclosure may be used to describe various components, but the components should not be limited by terms. The terms are used only for the purpose of distinguishing one component from other components.

The disclosure relates to a piping vibration absorber apparatus having a vibration monitoring system, and more specifically, to a piping vibration absorber apparatus having a vibration monitoring system, in which the piping vibration absorber apparatus may reduce piping vibration using an elastic plate and a mass plate, absorb vibration energy and shock using a wire damper, absorb vibration energy through a vibration damping material and the curvature of the elastic plate, and supply power to a vibration sensor through its own energy harvesting without external power supply such that the state of piping vibrations may be remotely monitored by the vibration monitoring system.

A piping vibration absorber apparatus having a vibration monitoring system according to an embodiment improves disadvantages of a method of reinforcing a pipe support that has been mainly used to reduce vibration of a power plant piping, and strengthens technical details that could not be implemented with conventional vibration absorbers.

The frequency of vibration occurring in a power plant piping is mostly low frequency of 30 Hz or below, and in order to reduce such vibration, a piping vibration absorber apparatus having a vibration monitoring system according to an embodiment may implement a natural frequency as a low frequency through a vibration absorber of a specific shape.

A piping vibration absorber apparatus having a vibration monitoring system according to an embodiment may be easily attached to and detached from a pipe 10 on site while reducing vibration, and it is easy to control the degree of reduction in piping vibration and the natural frequency.

In addition, the piping vibration absorber apparatus having a vibration monitoring system according to the embodiment has a damping function and a shock absorption function to prevent fatigue damage and absorb vibration energy, and may check the vibration trend in real time by supplying power to a vibration sensor through its own energy harvesting without external power supply. Hereinafter, preferred embodiments of the inventive concept are described in detail with reference to the accompanying drawings.

A piping vibration absorber apparatus having a vibration monitoring system according to an embodiment includes a vibration absorber 100. The piping vibration absorber apparatus having a vibration monitoring system according to an embodiment may reduce the vibration of a pipe 10 while the vibration absorber 100 vibrates in reverse phase with the vibration of the pipe 10.

Specifically, as the natural frequency of the vibration absorber 100 is adjusted, the vibration absorber 100 may be vibrated in reverse phase with the vibration of the pipe 10, thereby reducing the vibration of the pipe 10.

In the piping vibration absorber apparatus having a vibration monitoring system according to the embodiment, one vibration absorber 100 may be provided, or a plurality of vibration absorbers 100 may be provided.

The plurality of vibration absorbers 100 provided in the piping vibration absorber apparatus having a vibration monitoring system according to an embodiment have the same configuration, but only the natural frequencies of the plurality of vibration absorbers 100 may be differently adjusted. Hereinafter, the vibration absorber 100 is described in detail.

The vibration absorber 100 according to an embodiment includes an elastic plate 110, a mass plate 120, and a wire damper 130.

Figure 2:
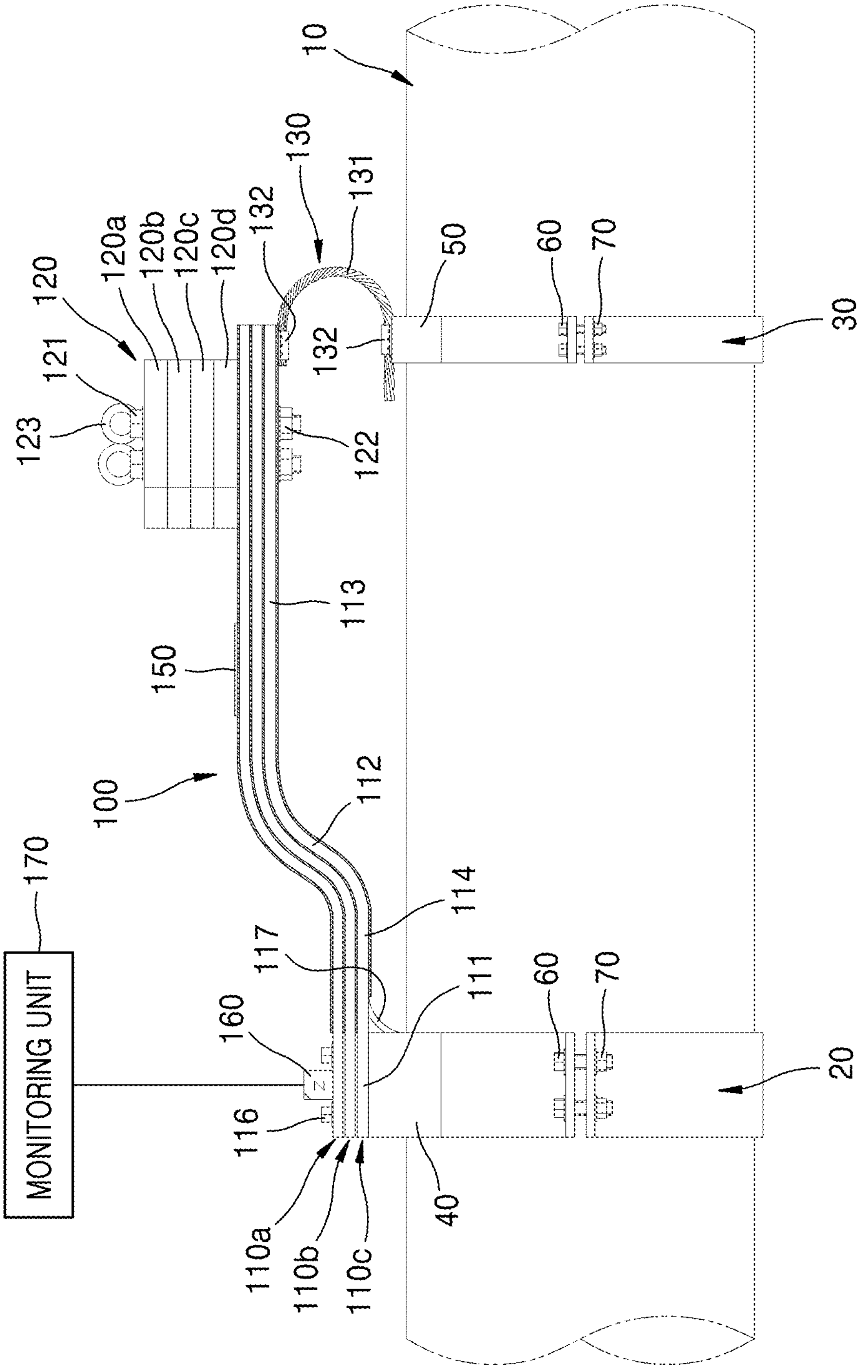
FIG. 2 is a side view of the piping vibration absorber apparatus having a vibration monitoring system according to an embodiment.

Referring to FIGS. 1 and 2, the elastic plate 110 according to an embodiment is formed in a cantilever shape with one side joined to a pipe 10. The elastic plate 110 may be formed in a plate shape, and one side of the elastic plate 110 may be fixedly coupled to the pipe 10.

Figure 3:
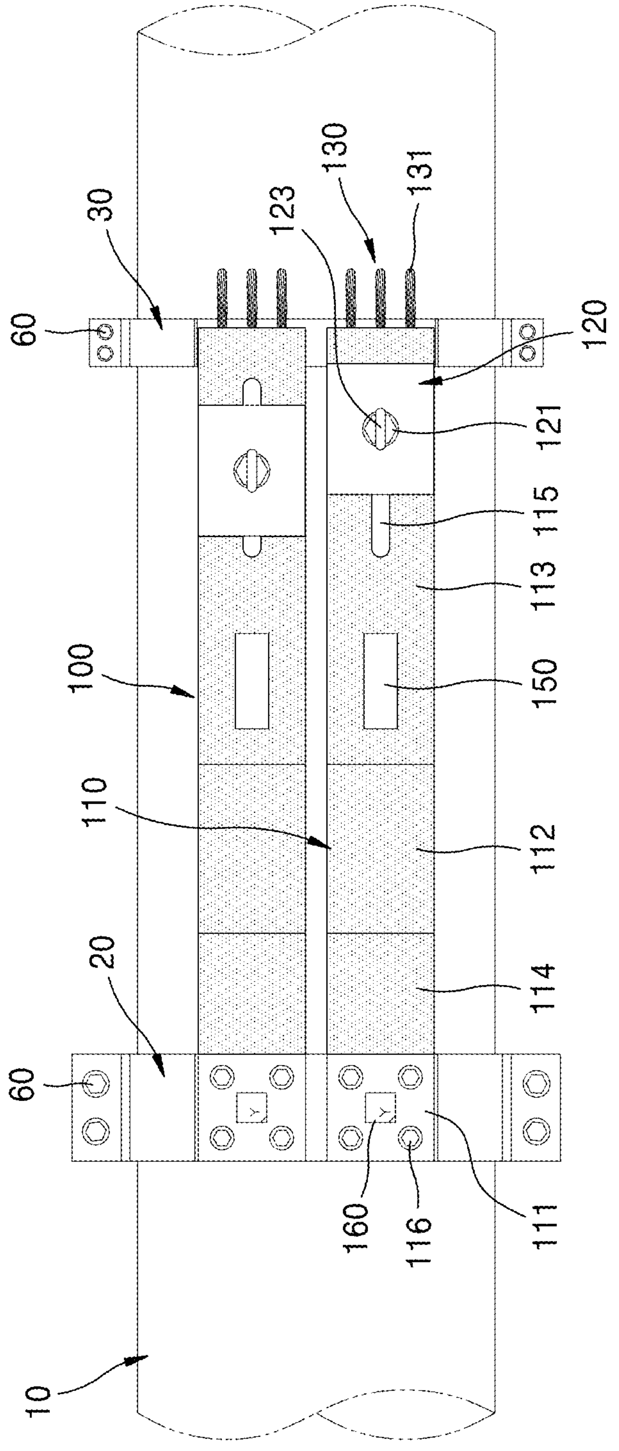
FIG. 3 is a plan view of the piping vibration absorber apparatus having a vibration monitoring system according to an embodiment.
Figure 4:
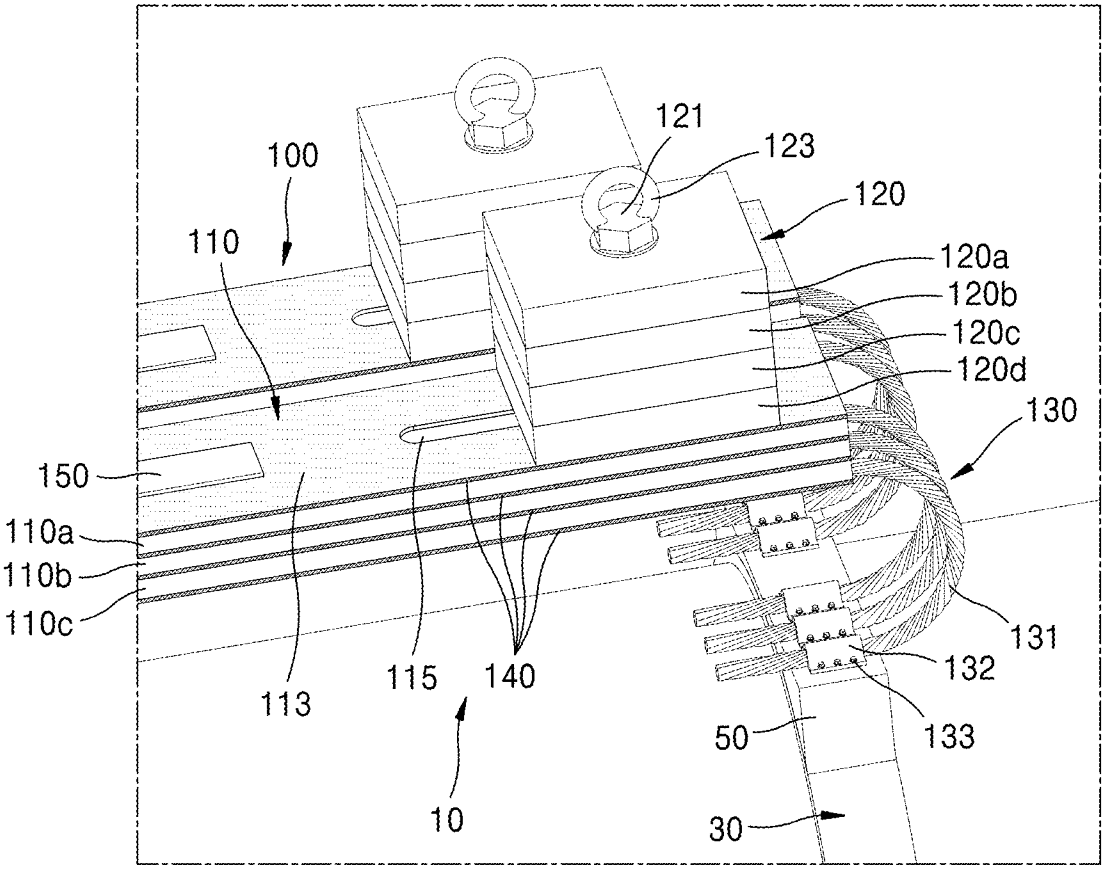
FIG. 4 is an enlarged view of another side of an elastic plate, a mass plate, and a wire damper portion according to an embodiment.

Referring to FIGS. 3 and 4, the mass plate 120 is installed on the elastic plate 110 and has a designated mass. The mass plate 120 may be coupled to the upper portion of the elastic plate 110, and the degree of reduction of vibration generated in the pipe 10 may be adjusted through the mass plate 120.

Specifically, the mass plate 120 is made of a designated mass, and the vibration absorber 100 is provided with a plurality of mass plates 120, and plurality of mass plates 120 may be stacked on the elastic plate 110.

According to an embodiment, the natural frequency of the vibration absorber 100 may be adjusted by adjusting the number of mass plates 120 stacked on the elastic plate 110, and thus the degree of reduction of vibration generated in the pipe 10 may be adjusted.

As will be described later, the natural frequency of the vibration absorber 100 may be also adjusted by adjusting the position where the mass plate 120 is coupled to the elastic plate 110 through a slot 115 provided on the elastic plate 110.

Referring to FIGS. 3 and 4, the wire damper 130 includes a steel wire 131 and is coupled to the other side of the elastic plate 110. The elastic plate 110 may be formed in a plate shape that is bent while forming a curvature.

One side of the elastic plate 110 may be fixedly coupled to the pipe 10, and the other side of the elastic plate 110 may be spaced apart from the pipe 10 by a designated distance. In this way, one side of the elastic plate 110 is fixedly coupled to the pipe 10, and the other side of the elastic plate 110 is spaced apart by a designated distance in the pipe 10, so that the elastic plate 110 is formed in a cantilever shape.

The wire damper 130 is coupled to the other side of the elastic plate 110 and extends to the pipe 10. Specifically, one side of the steel wire 131 provided in the wire damper 130 may be coupled to the other side of the elastic plate 110, and the other side of the steel wire 131 provided in the wire damper 130 may be coupled to the pipe 10. In this way, the other side of the elastic plate 110 may be connected to the pipe 10 through the wire damper 130.

One side of the elastic plate 110 according to an embodiment may be coupled to the pipe 10 through a first clamp 20, and the wire damper 130 may be coupled to the pipe 10 through a second clamp 30.

Referring to FIGS. 2 and 3, the piping vibration absorber apparatus having a vibration monitoring system according to an embodiment may include the first clamp 20 and the second clamp 30. The first clamp 20 is placed on one side of the elastic plate 110, and the second clamp 30 is placed on the other side of the elastic plate 110.

The first clamp 20 may be coupled to the pipe 10 at one side of the elastic plate 110. The first clamp 20 includes a plurality of clamps having a semicircular shape or an arc shape, and the first clamp 20 including the plurality of clamps may be coupled to the outside of the pipe 10.

The plurality of clamps included in the first clamp 20 may be coupled to each other through a bolt 60 and a nut 70. The first clamp 20 may be coupled to the outside of the pipe 10 by arranging the plurality of clamps on the outside of the pipe 10 and combining the plurality of clamps through the bolt 60 and the nut 70.

The second clamp 30 may be coupled to the pipe 10 at the other side of the elastic plate 110. The second clamp 30 includes a plurality of clamps having a semicircular shape or an arc shape, and the second clamp 30 including the plurality of clamps may be coupled to the outside of the pipe 10.

The plurality of clamps included in the second clamp 30 may be coupled to each other through a bolt 60 and a nut 70. The second clamp 30 may be coupled to the outside of the pipe 10 by arranging the plurality of clamps on the outside of the pipe 10 and combining the plurality of clamps through the bolt 60 and the nut 70.

According to an embodiment, one side of the elastic plate 110 may be coupled to the first clamp 20, and the other side of the elastic plate 110 may be connected to the second clamp 30 through the wire damper 130.

Figure 5:
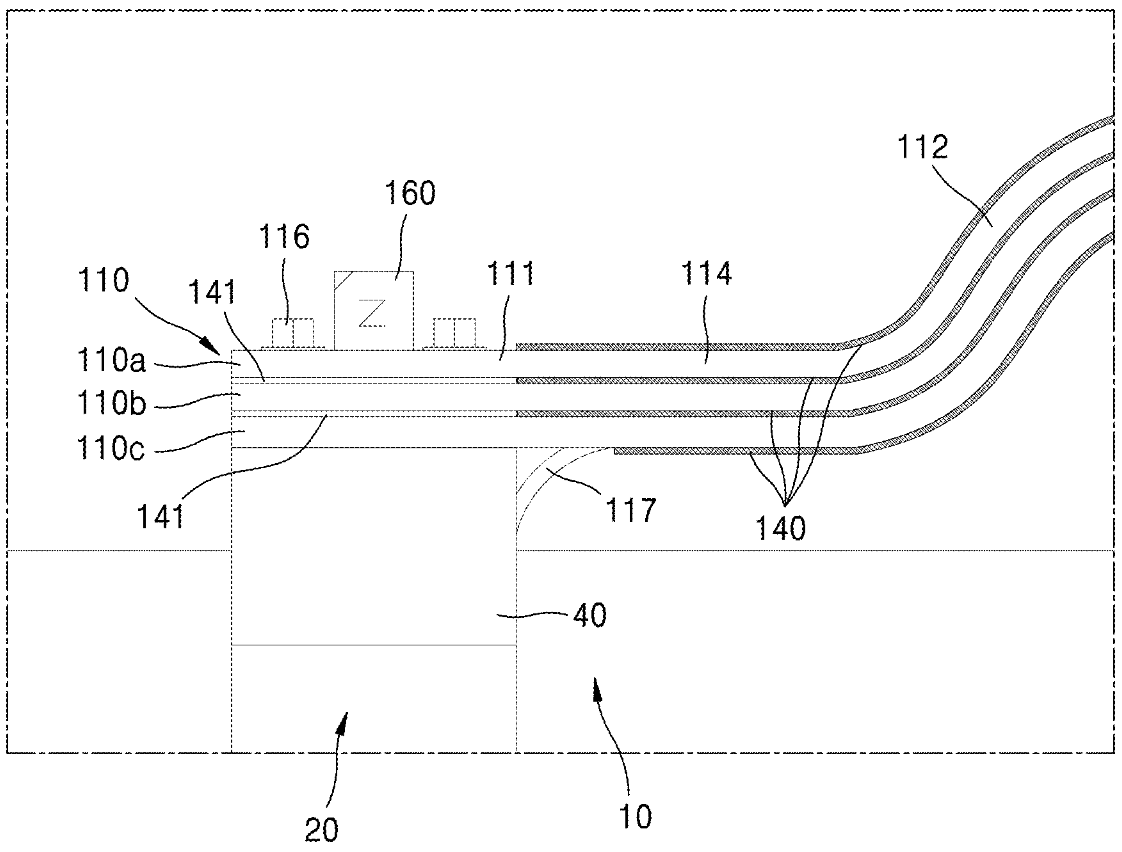
FIG. 5 is an enlarged side view of one side portion of the elastic plate according to an embodiment.

The first clamp 20 according to an embodiment may include a first saddle 40, and the second clamp 30 may include a second saddle 50. Referring to FIG. 5, the first saddle 40 is coupled to the first clamp 20, and may have a flat upper surface. In addition, the first saddle 40 according to an embodiment may be integrally formed with the first clamp 20.

Figure 6:
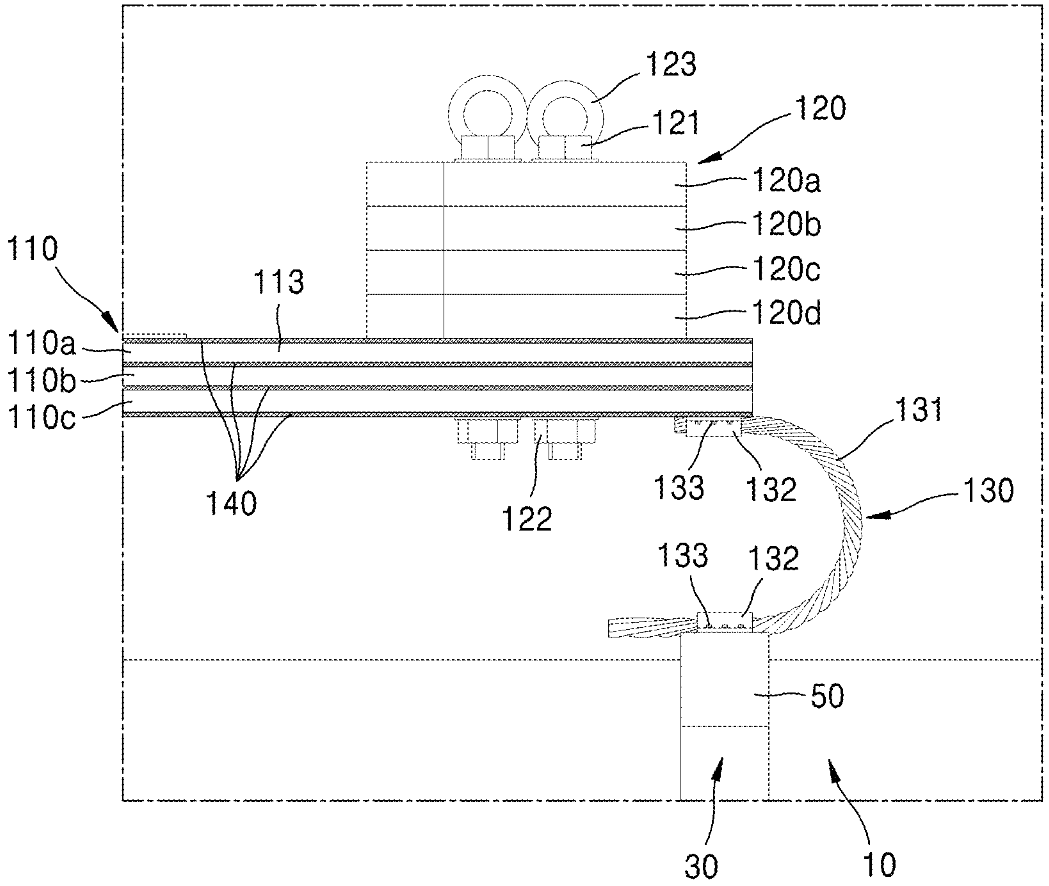
FIG. 6 is an enlarged side view of the other side of the elastic plate, the mass plate, and the wire damper portion according to an embodiment.

Referring to FIG. 6, the second saddle 50 is coupled to the second clamp 30, and may have a flat upper surface. In addition, the second saddle 50 according to an embodiment may be integrally formed with the second clamp 30.

According to an embodiment, one side of the elastic plate 110 may be fixed to the first saddle 40, and the steel wire 131 of the wire damper 130 may be fixed to the second saddle 50.

Figure 7:
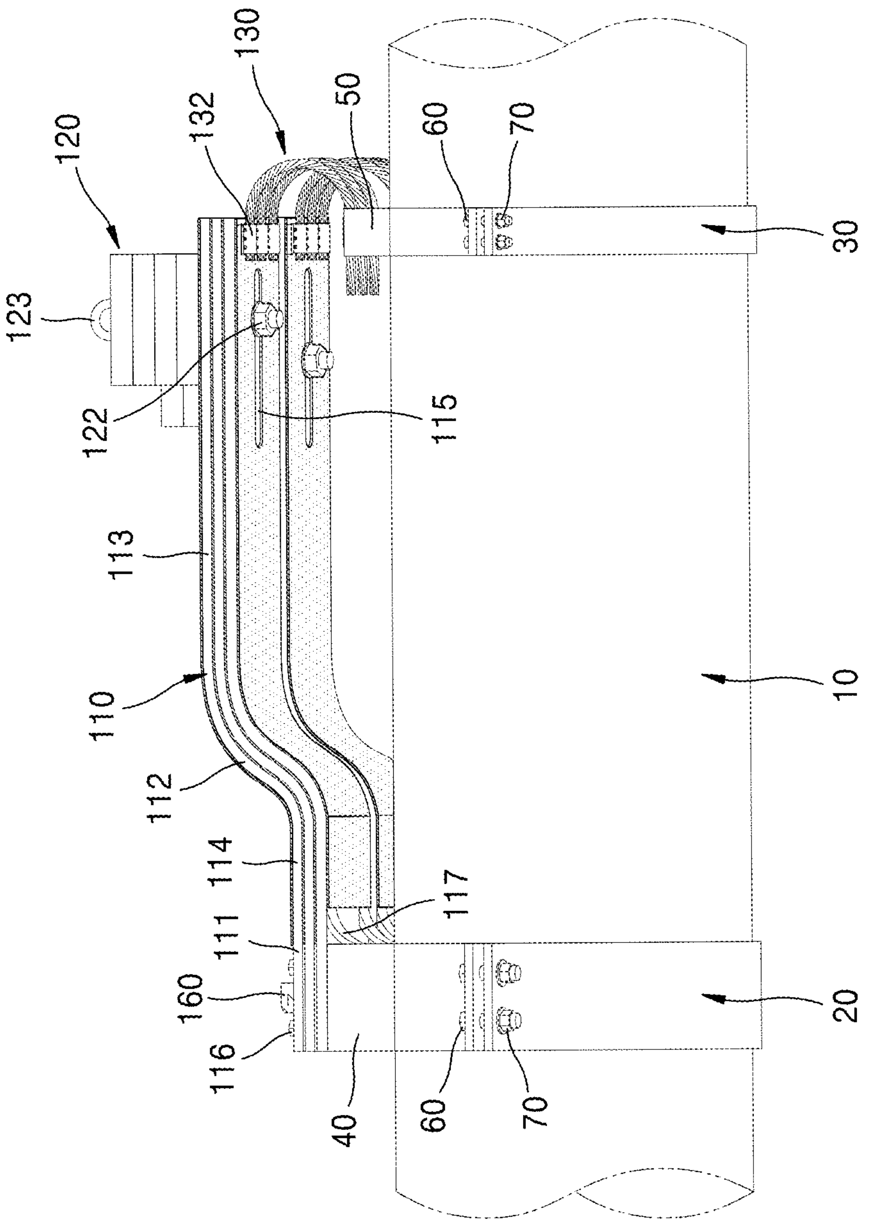
FIG. 7 is a perspective view of a lower portion of the piping vibration absorber apparatus having a vibration monitoring system according to an embodiment.

Referring to FIGS. 6 and 7, the second saddle 50 according to an embodiment may be provided with a wire fixing unit 132 for fixing the steel wire 131. The wire fixing unit 132 is coupled to the second saddle 50, and the wire fixing unit 132 has a space into which the steel wire 131 may be inserted.

Specifically, the wire fixing unit 132 may have a semi-circular cross section, and the steel wire 131 may be arranged inside the wire fixing unit 132 having a semicircular shape. The second saddle 50 may be provided with a bolt hole into which a wire fixing unit bolt 133 may be inserted, and the wire fixing unit 132 may be fixed to the second saddle 50 through the wire fixing unit bolt 133.

When the steel wire 131 is arranged inside the wire fixing unit 132, and the wire fixing unit 132 is fixed to the second saddle 50, the steel wire 131 may be fixed to the second saddle 50.

Figure 8:
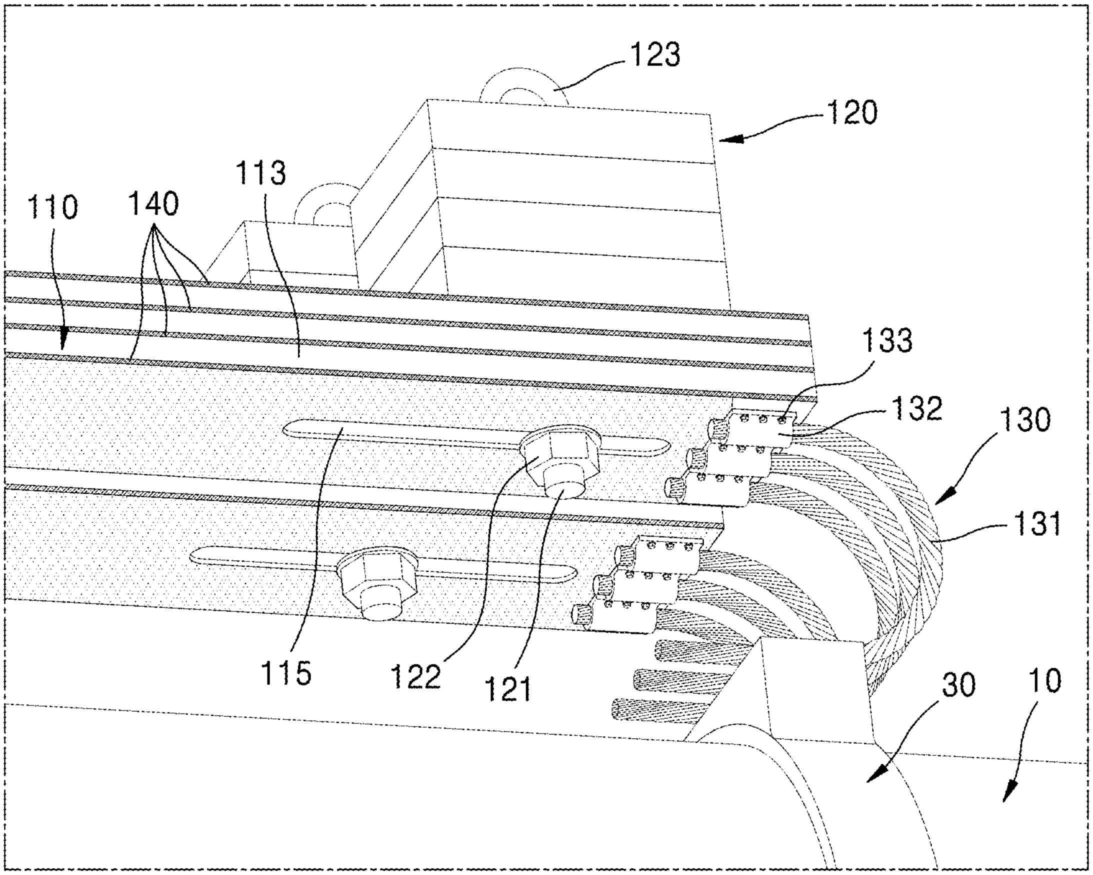
FIG. 8 is an enlarged perspective view of the other side of the elastic plate, the mass plate, and the wire damper portion according to an embodiment.

In addition, another wire fixing unit 132 for fixing the steel wire 131 may be provided in the bottom of the other side of the elastic plate 110 according to the embodiment. Referring to FIGS. 7 and 8, the wire fixing unit 132 is coupled to the lower portion of the other side of the elastic plate 110, and the wire fixing unit 132 has a space into which the steel wire 131 may be inserted.

Specifically, the wire fixing unit 132 may have a semi-circular cross section, and the steel wire 131 may be arranged inside the wire fixing unit 132 having a semicircular shape. A bolt hole into which the wire fixing unit bolt 133 may be inserted may be provided in the bottom of the other side of the elastic plate 110, and the wire fixing unit 132 may be fixed to the other side of the elastic plate 110 through the wire fixing unit bolt 133.

When the steel wire 131 is arranged inside the wire fixing unit 132, and the wire fixing unit 132 is fixed to the other side of the elastic plate 110, the steel wire 131 may be fixed to the other side of the elastic plate 110.

In this way, by fixing the steel wire 131 to the other side of the elastic plate 110 and the second saddle 50, the other side of the elastic plate 110 and the second saddle 50 may be connected by means of the steel wire 131.

According to an embodiment, the steel wire 131 is formed in a U-shape and may be coupled to the wire fixing unit 132 provided in each of the other side of the elastic plate 110 and the second saddle 50. Specifically, the steel wire 131 may extend in a U-shape and connect the other side of the elastic plate 110 with the second saddle 50.

Referring to FIG. 8, the wire damper 130 may include a plurality of steel wires 131, and the plurality of steel wires 131 may be coupled to the other side of the elastic plate 110 and the second saddle 50.

The wire damper 130 performs a damping function and an impact absorbing function when vibration occurs in the elastic plate 110. The steel wire 131 may be manufactured by twisting several strands of thin steel wires, and the vibration displacement of the elastic plate 110 may be reduced due to the damping effect due to the stiffness of the steel wire 131 provided in the wire damper 130.

As the vibration displacement of the elastic plate 110 is reduced through the steel wire 131, fatigue damage of the elastic plate 110 may be prevented. In addition, as the vibration displacement of the elastic plate 110 is reduced through the steel wire 131, a shock absorption function may be performed to prevent mutual damage applied to the pipe 10 and the vibration absorber 100 caused by excessive displacement generated due to an impact load.

In addition, the plurality of steel wires 131 provided in the wire damper 130 have elasticity and damping functions with respect to bending, and may work as a damping function by absorbing vibration energy due to the stiffness and damping effect of the plurality of steel wires 131.

According to an embodiment, the length of the steel wire 131 extending from the wire fixing unit 132 to the other side of the elastic plate 110 may be adjusted by adjusting the position where the steel wire 131 is fixed to the wire fixing unit 132 provided in the second saddle 50.

Specifically, the length of the steel wire 131 extending from the other side of the elastic plate 110 to the second saddle 50 may be changed according to the position where the steel wire 131 is fixed to the wire fixing unit 132 provided in the second saddle 50.

Referring to FIG. 8, the vibration absorber 100 according to the embodiment may adjust the stiffness and damping value by adjusting the length of the steel wire 131 extending from the other side of the elastic plate 110 to the second saddle 50.

Referring to FIGS. 2 and 3, the elastic plate 110 according to an embodiment includes a fixing part 111, a curvature part 112, a first flat plate part 113, and a second flat plate part 114.

The fixing part 111 is coupled to the first clamp 20, and the fixing part 111 may have a flat plate shape. The fixing part 111 is provided on one side of the elastic plate 110, and the fixing part 111 may be a part coupled to the first clamp 20.

According to an embodiment, the fixing part 111 may be coupled to the first saddle 40 provided in the first clamp 20. A bolt hole for inserting the fixing bolt 116 may be provided in the first saddle 40, and the fixing part 111 may be coupled to the first saddle 40 through the fixing bolt 116 after the fixing part 111 is seated on the first saddle 40.

Referring to FIGS. 2 and 3, the second flat plate part 114 extends from the fixing part 111 and has a flat plate shape. The second flat plate part 114 is formed in a flat plate shape and extends from one side of the elastic plate 110 to the other side of the elastic plate 110.

Referring to FIGS. 2 and 3, the first flat plate part 113 is formed in a flat plate shape while the wire damper 130 is coupled to the first flat plate part 113. The first flat plate part 113 is provided on the other side of the elastic plate 110, and the first flat plate part 113 may have a flat plate shape.

The wire damper 130 may be coupled to the first flat plate part 113. Specifically, the wire fixing unit 132 for fixing the steel wire 131 may be provided in the bottom of the first flat plate part 113, and the steel wire 131 may be coupled to the lower part of the first flat plate part 113 through the wire fixing unit 132.

The curvature part 112 connects the second plate part 114 with the first plate part 113 and extends while forming a curvature. The curvature part 112 may be provided between the second plate part 114 and the first plate part 113, and the curvature part 112 may be formed in a curved plate shape.

Referring to FIG. 2, as the curvature part 112 is provided between the second plate part 114 and the first plate part 113, the elastic plate 110 may be coupled to the pipe 10 in a cantilever shape. In addition, as the curvature part 112 is provided between the second plate part 114 and the first plate part 113, a space for installing the wire damper 130 on the other side of the elastic plate 110 may be formed.

The elastic plate 110 according to an embodiment may increase flexibility through the curvature part 112. The curvature part 112 is a section having higher flexibility than the second flat part 114 and the first flat part 113, and the flexibility of the elastic plate 110 may be increased as the curvature part 112 is provided on the elastic plate 110.

Figure 9:
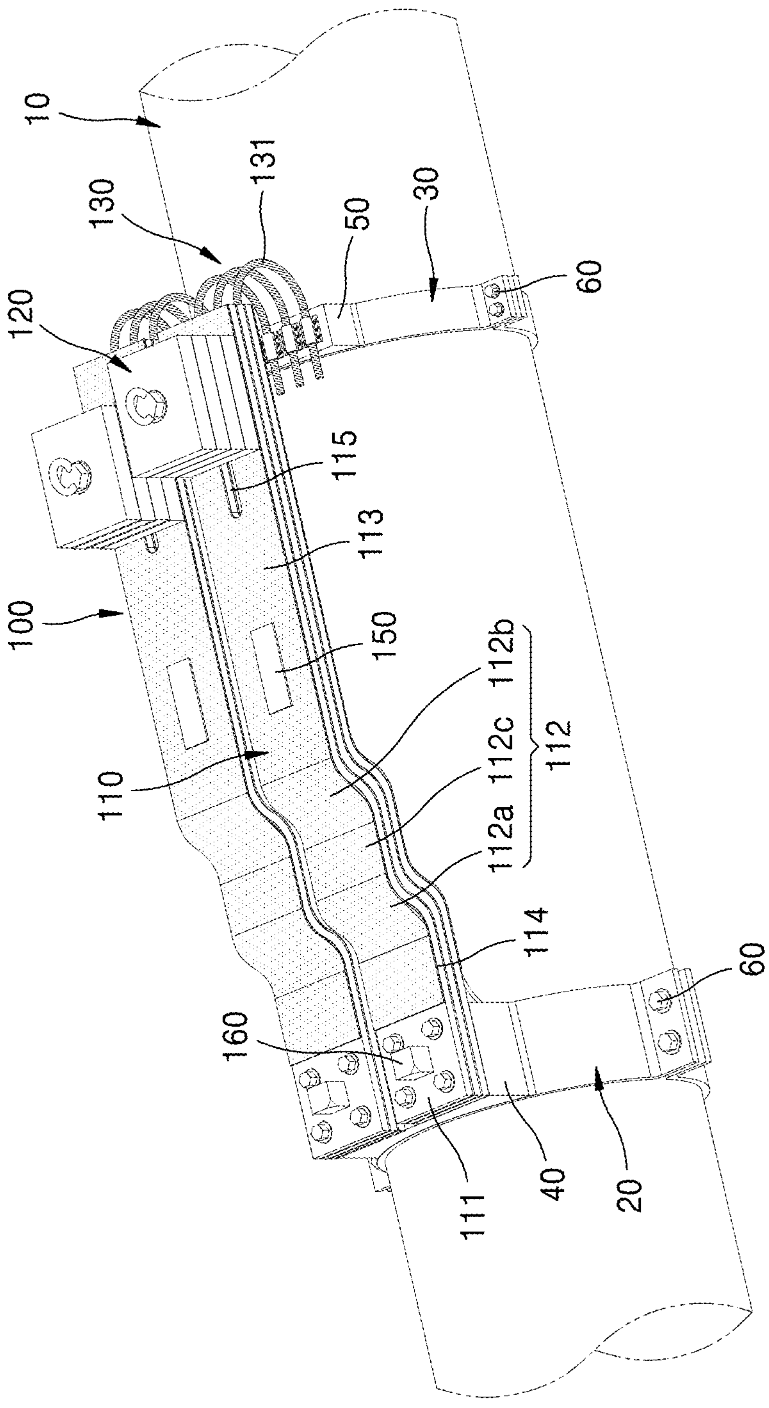
FIG. 9 is a perspective view illustrating a first curvature part and a second curvature part provided in a curvature part of the elastic plate according to an embodiment.

Referring to FIG. 9, the curvature part 112 according to an embodiment may include a first curvature part **112*a* extending at a first curvature, a second curvature part 112*b* extending at a second curvature, and a connection part 112*c* connecting the first curvature part 112*a* with the second curvature part 112*b***.

Specifically, in the case of the curved part 112, the curvature may occur only one time as shown in FIG. 2, and the curvature may occur two times as shown in FIG. 9. In addition, if necessary, the curvature may occur three or more times in the curved part 112.

The vibration absorber 100 according to an embodiment may include a plurality of elastic plates 110. The vibration absorber 100 may use a combined elastic plate including the plurality of elastic plates 110, and the vibration absorber 100 may reduce the vibration of the pipe 10 through the combined elastic plate including the plurality of elastic plates 110.

Specifically, the vibration absorber 100 may adjust the natural frequency of the combined elastic plate so that the combined elastic plate may vibrate in reverse phase with the vibration of the pipe 10, thereby reducing the vibration of the pipe 10.

The combined elastic plate may be the plurality of elastic plates 110 stacked. According to an embodiment, as shown in FIG. 6, the vibration absorber 100 may include a first elastic plate **110*a*, a second elastic plate 110*b*, and a third elastic plate 110*c*, and the first elastic plate 110*a*, the second elastic plate 110*b*, and the third elastic plate 110*c*** may be stacked.

However, the vibration absorber 100 is not limited to including the first elastic plate **110*a*, the second elastic plate 110*b*, and the third elastic plate 110*c*, and the number of the elastic plates 110 included in the vibration absorber 100** may be changed.

The vibration absorber 100 may adjust the natural frequency of the vibration absorber 100 through the number of stacked elastic plates 110, the shape of the elastic plate 110, the length of the elastic plate 110, and the like.

Referring to FIG. 5, the vibration absorber 100 according to an embodiment may include a reinforcing plate 117 connecting the lower part of the second flat plate part 114 to the first clamp 20.

The reinforcing plate 117 connects the lower part of the second flat plate part 114 to the first clamp 20, and the reinforcing plate 117 may connect the lower part of the second flat plate part 114 to the side surface of the first saddle 40 provided in the first clamp 20.

The reinforcing plate 117 may reinforce the second flat plate part 114. The second flat plate part 114 may be a part where alternating stress occurs when vibration occurs in the elastic plate 110, and thus the second flat plate part 114 may be vulnerable to fatigue damage.

The reinforcing plate 117 is for reinforcing the second flat plate part 114, and the reinforcing plate 117 may be connected to the side surface of the first saddle 40 while extending in a curved shape from the lower part of the second flat plate part 114.

According to an embodiment, the reinforcing plate 117 may be formed in a curved shape, and a plurality of reinforcing plates 117 may reinforce the front part of the second flat plate part 114.

Referring to FIGS. 5 and 6, the vibration absorber 100 may include vibration damping materials 140 which are respectively provided between the plurality of elastic plates 110, on the top portion of the plurality of elastic plates 110, and on the bottom portion of the plurality of elastic plates 110.

The vibration damping materials 140 may be provided between the elastic plates 110, on the top portion of the elastic plates 110, and the bottom portion of the elastic plates 110, and may increase a damping value of the combined elastic plate through the vibration damping materials 140.

As the damping value of the combined elastic plate is increased through the vibration damping materials 140, vibration displacement during vibration of the combined elastic plate may be reduced to prevent fatigue damage of the combined elastic plate. In addition, vibration energy may be absorbed by increasing the damping value of the combined elastic plate through the vibration damping materials 140, which may perform a damping function.

The vibration damping materials 140 according to an embodiment may include a material that may be deformed as the combined elastic plate vibrates. The vibration damping materials 140 may be deformed by the vibration of the combined elastic plate to thereby absorb vibration, and the vibration damping materials 140 may perform a damping function absorbing vibration energy and converting the absorbed vibration energy into thermal energy through deformation.

In addition, the vibration damping materials 140 according to the embodiment may widen the frequency range in which resonance occurs by increasing the damping value of the combined elastic plate, thereby easily adjusting the natural frequency of the combined elastic plate to match the vibration frequency of the pipe 10.

Referring to FIGS. 5 and 6, the vibration damping materials 140 may be provided between the plurality of first flat plate parts 113, the plurality of the second flat plate parts 114, and the plurality of the curvature part 112 according to an embodiment, and spacers 141 having the same thickness as the vibration damping materials 140 and higher strength than the vibration damping materials 140 may be provided between the plurality of fixing parts 111.

The vibration damping materials 140 may be provided between the plurality of first flat plate parts 113, the plurality of second flat plate parts 114, and the plurality of the curvature part 112 according to an embodiment, but the spacers 141 instead of the vibration damping materials 140 may be provided between the plurality of fixing parts 111.

Referring to FIGS. 5 and 6, the spacers 141 have the same thickness as the vibration damping materials 140, but have higher strength than the vibration damping materials 140. Since the spacers 141 may be fixed to the fixing part 111 through a fixing part bolt 116, the spacers 141 may be made of a material resistant to compression load.

The spacers 141 are to firmly fix the fixing part 111 to the first saddle 40 while preventing a gap between the plurality of fixing parts 111 provided on the combined elastic plate. In addition, the vibration damping materials 140 installed between the plurality of second flat plate parts 114 may be prevented from being excessively compressed through the spacers 141.

Referring to FIG. 4, the plurality of mass plates 120 may be provided on the vibration absorber 100, and the plurality of mass plates 120 may be stacked on the elastic plate 110. The vibration absorber 100 according to an embodiment may adjust the natural frequency by adjusting the number of mass plates 120 stacked on the elastic plate 110, and thus may adjust the degree of reduction of vibration generated in the pipe 10.

According to an embodiment, the number of mass plates 120 installed on the elastic plate 110 may be four. Specifically, the mass plate 120 may include a first mass plate 120*a*, a second mass plate 120*b*, a third mass plate 120*c*, and a fourth mass plate 120*d*.

However, the number of mass plates 120 installed on the elastic plate 110 is not limited to four, and the number of mass plates 120 installed on the elastic plate 110 may be changed to adjust the natural frequency of the vibration absorber 100.

Referring to FIGS. 4 and 6, the vibration absorber 100 according to an embodiment may include an eye bolt 121 and a nut 122 for installing the mass plate 120 on the elastic plate 110.

The eye bolt 121 is for installing the plurality of mass plates 120 on the elastic plate 110, and the eye bolt 121 may be inserted into the elastic plate 110 through the mass plate 120.

The nut 122 is fastened to the eye bolt 121, and the mass plate 120 and the elastic plate 110 may be integrated by inserting the eye bolt 121 into the plurality of mass plates 120 and fastening the nut 122.

According to an embodiment, the eye bolt 121 may be provided with a ring 123. The ring 123 may connect the eye bolt 121 to a fixed point, and a steel wire may be connected to the ring 123.

Specifically, the steel wire connected to the ring 123 may be connected to a rigid structure or the first clamp 20. In this way, when the eye bolt 121 is connected to a rigid structure or the first clamp 20 through the ring 123, it is possible to prevent damage to surrounding facilities by separating the mass plate 120 from the elastic plate 110 due to fatigue damage.

However, when connecting the ring 123 with a rigid structure or the first clamp 20 through a steel wire, it is preferable that the steel wire is loosely connected only to the extent that the steel wire does not affect the natural frequency of the vibration absorber 100.

Referring to FIGS. 7 and 8, a slot 115 extending in the longitudinal direction may be provided in the elastic plate 110. The slot 115 may be provided on the first flat plate part 113 of the elastic plate 110, and the slot 115 may be elongated through the center of the first flat plate part 113.

The slot 115 may allow the eye bolt 121 to be inserted, and the eye bolt 121 may be inserted into the slot 115 through the mass plate 120.

The slot 115 extends in the longitudinal direction, and the eye bolt 121 may move in the direction in which the slot 115 extends. When the nut 122 is coupled to the eye bolt 121 after moving the eye bolt 121 along the slot 115, the position of the eye bolt 121 may be fixed. When the position of the eye bolt 121 is fixed, the position of the mass plate 120 may also be fixed.

Referring to FIGS. 4 and 8, when the eye bolt 121 is fixed to the slot 115 after the fixed position of the eye bolt 121 has been adjusted, the position where the mass plate 120 is fixed may be adjusted. Specifically, when the eye bolt 121 is fixed after moving the eye bolt 121 along the slot 115, the mass plate 120 may be fixed to a position where the eye bolt 121 is fixed.

According to an embodiment, when the position of the mass plate 120 installed on the elastic plate 110 is adjusted through the slot 115, the natural frequency of the vibration absorber 100 may be adjusted.

As described above, the vibration absorber 100 according to the embodiment may adjust the natural frequency by adjusting the number of elastic plates 110 stacked, the shape of the elastic plates 110, the length of the elastic plates 110, the number of mass plates 120 stacked, and the position where the mass plates 120 are installed on the elastic plates 110.

In addition, the vibration absorber 100 according to the embodiment may adjust the natural frequency by adjusting the number of steel wires 131 provided in the wire damper 130 and the length of the steel wire 131 extending from the other side of the elastic plate 110 to the second saddle 50.

In this way, as the natural frequency may be easily adjusted through the vibration absorber 100, the natural frequency of the vibration absorber 100 may be accurately adjusted to correspond to the vibration frequency of the pipe 10. In addition, the degree of reduction in piping vibration may be adjusted as the natural frequency may be easily adjusted through the vibration absorber 100.

The bolt and the nut used in the embodiment described above may include a washer for preventing loosening.

Referring to FIGS. 1 and 2, the vibration absorber 100 according to an embodiment includes a vibration sensor 160 installed on the elastic plate 110 to measure the vibration of the pipe 10, and a piezoelectric element 150 installed on the elastic plate 110 and connected to the vibration sensor 160 to supply power to the vibration sensor 160.

The vibration sensor 160 may measure the vibration of the elastic plate 110, and the vibration sensor 160 may be installed in the fixing part 111 of the elastic plate 110. The upper part of the fixing part 111 is formed as a flat surface so that the vibration sensor 160 may be seated thereon, and the vibration sensor 160 may be fixed to the fixing part 111.

The fixing part 111 may be installed to be integrated with the pipe 10 and may move in the same manner as the pipe 10. Therefore, when the vibration of the fixing part 111 is measured through the vibration sensor 160, the vibration of the pipe 10 may be measured.

The piezoelectric element 150 supplies power to the vibration sensor 160, and the vibration sensor 160 may receive power through the piezoelectric element 150. The piezoelectric element 150 may convert vibration energy into electrical energy, and may supply power to the vibration sensor 160 in an energy harvesting method through the piezoelectric element 150.

The piezoelectric element 150 may be installed on the elastic plate 110 and connected to the vibration sensor 160 to supply power to the vibration sensor 160. The piezoelectric element 150 according to an embodiment may be installed on the first flat plate part 113 of the elastic plate 110, and the piezoelectric element 150 may include a piezoelectric material that generates an electromotive force by deformation.

When the elastic plate 110 is deformed by vibration, the piezoelectric element 150 may be deformed to accordingly generate an electromotive force. The electromotive force generated by the piezoelectric element 150 may be transmitted to the vibration sensor 160, and the vibration sensor 160 may be operated through the electromotive force.

According to an embodiment, an energy storage module (not shown) for storing electrical energy may be connected to the piezoelectric element 150, and power may be supplied to the vibration sensor 160 through the energy storage module.

Referring to FIG. 2, a piping vibration absorber apparatus having a vibration monitoring system according to an embodiment may include a monitoring unit 170 capable of receiving data from the vibration sensor 160.

The monitoring unit 170 is provided outside the vibration absorber 100, and the monitoring unit 170 may include a computer system such as a computer or a mobile device.

The vibration sensor 160 according to an embodiment may include a vibration frequency analyzer (not shown) and a vibration data transmission device (not shown), and the vibration sensor 160 may transmit vibration data to the monitoring unit 170. The vibration sensor 160 may wirelessly transmit vibration data to the monitoring unit 170, and the monitoring unit 170 may receive vibration data from the vibration sensor 160.

The piping vibration absorber apparatus having a vibration monitoring system according to an embodiment supplies power to the vibration sensor 160 through the piezoelectric element 150 and receives vibration data from the vibration sensor 160 through the monitoring unit 170, thereby checking the vibration state of the pipe 10 in real time.

In addition, the piping vibration absorber apparatus having a vibration monitoring system according to an embodiment may check the vibration state of the pipe 10 remotely at a location away from the pipe 10 as data is wirelessly transmitted to the monitoring unit 170 from the vibration sensor 160 while the monitoring unit 170 is provided outside the vibration absorber 100.

Figure 10:
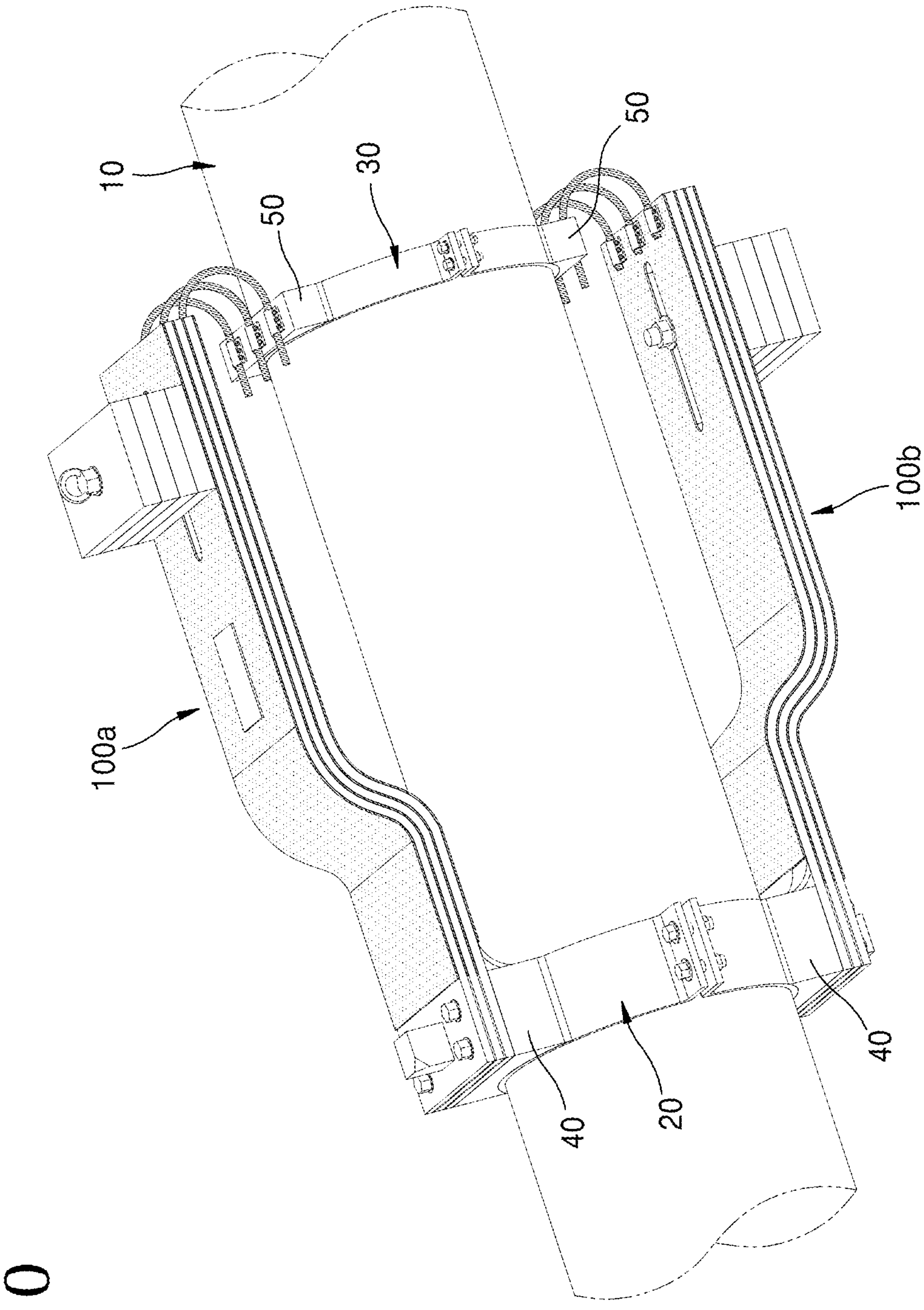
FIG. 10 is a perspective view illustrating a plurality of vibration absorbers disposed at an upper portion and a lower portion around a pipe according to an embodiment.

According to an embodiment, a plurality of vibration absorbers 100 may be provided. Referring to FIG. 10, a piping vibration absorber apparatus having a vibration monitoring system according to an embodiment may include a first vibration absorber 100*a* and a second vibration absorber 100*b* that reduce the vibration of the pipe 10 when the pipe 10 vibrate.

When two vibration absorbers 100 are provided in a piping vibration absorber apparatus having a vibration monitoring system according to an embodiment, vibration may be reduced at the same time when two different proximate vibration frequency components such as beats exist.

In addition, when two vibration absorbers 100 are provided in a piping vibration absorber apparatus having a vibration monitoring system according to an embodiment, if the pipe vibration is a single frequency component, the pipe vibration may be reduced by the first vibration absorber 100*a*, and transient vibration generated after an impact load occurs in the pipe may be reduced by the second vibration absorber 100*b*.

However, the piping vibration absorber apparatus having a vibration monitoring system according to the embodiment is not limited to including two vibration absorbers 100. The piping vibration absorber apparatus having a vibration monitoring system according to the embodiment may include two or more vibration absorbers 100 when multiple frequencies of pipe vibration exist or as necessary.

Figure 11:
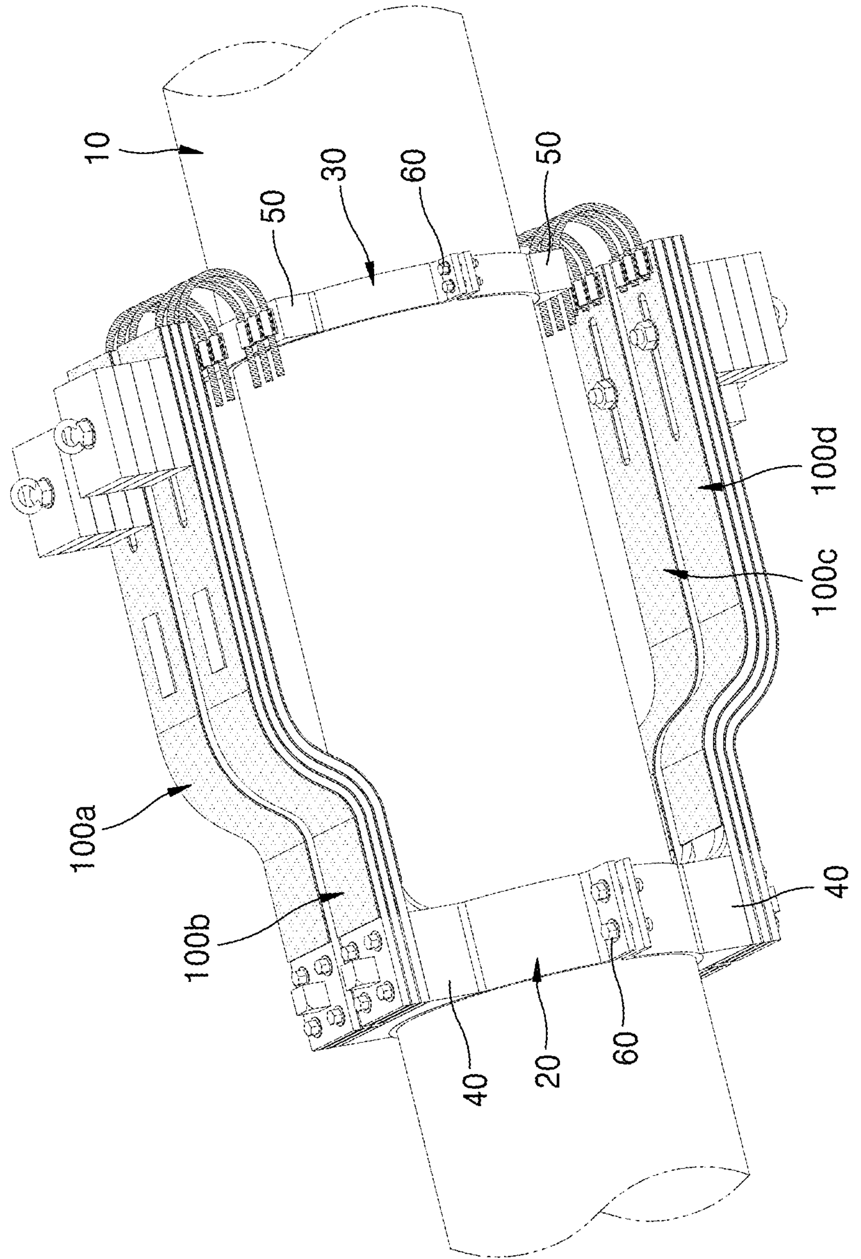
FIG. 11 is a perspective view illustrating a plurality of vibration absorbers disposed at an upper portion and a lower portion around a pipe and arranged side by side around the pipe according to an embodiment.

For example, referring to FIG. 11, a piping vibration absorber apparatus having a vibration monitoring system according to the embodiment may be provided with a first vibration absorber 100*a*, a second vibration absorber 100*b*, a third vibration absorber 100*c*, and a fourth vibration absorber 100*d*.

When a plurality of vibration absorbers 100 are provided in a piping vibration absorber apparatus having a vibration monitoring system according to the embodiment, the plurality of vibration absorbers 100 may be arranged side by side around the pipe 10 as shown in FIG. 1.

In addition, when the diameter of the pipe 10 according to the embodiment is small, multiple vibration absorbers 100 may be placed above and below the pipe 10 as shown in FIG. 10.

FIG. 11 is a view illustrating that four vibration absorbers 100 are provided in a piping vibration absorber apparatus having a vibration monitoring system according to the embodiment in order to reduce pipe vibration when there are multiple frequencies of pipe vibration.

Referring to FIG. 11, the first vibration absorber 100*a* and the second vibration absorber 100*b* may be arranged parallel to the pipe 10, and the third vibration absorber 100*c* and the fourth vibration absorber 100*d* may be arranged parallel to the pipe 10.

In addition, referring to FIG. 11, the first vibration absorber 100*a* and the third vibration absorber 100*c* may be placed above and below the pipe 10, and the second vibration absorber 100*b* and the fourth vibration absorber 100*d* may be placed above and below the pipe 10.

The piping vibration absorber apparatus having a vibration monitoring system described above according to the embodiment has the following effects.

The piping vibration absorber apparatus having a vibration monitoring system according to the embodiment has the advantage of accurately reducing the vibration frequency component of the piping by adjusting the vibration absorber and supplying power to the vibration sensor through its own energy harvesting without external power supply.

In addition, the piping vibration absorber apparatus having a vibration monitoring system according to the embodiment has the advantage of not requiring a separate power supply or battery as power is supplied to the vibration sensor using vibration energy generated by the vibration absorber.

In addition, the piping vibration absorber apparatus having a vibration monitoring system according to the embodiment may remotely monitor piping vibration by transmitting data from the vibration sensor to the monitoring unit, which has the advantage of checking the trend of piping vibration in real time regardless of location.

In addition, the piping vibration absorber apparatus having a vibration monitoring system according to the embodiment has a damping function and a shock absorbing function that prevent fatigue damage to the vibration absorber and absorb vibration energy, so that even if transient vibration and shock occur in the piping, piping vibration absorber apparatus has the advantage of preventing mutual damage to the piping and the vibration absorber.

In addition, the piping vibration absorber apparatus having a vibration monitoring system according to the embodiment has the advantage of contributing to the normal operation and safety of the power plant by reducing the possibility that the piping is damaged by vibration.

In addition, the piping vibration absorber apparatus having a vibration monitoring system according to the embodiment has the advantage of being able to implement a low natural frequency even in a short distance by using a cantilever-shaped elastic plate and a mass plate, and has the advantage of checking the vibration frequency of the piping and adjusting the degree of reduction of piping vibration according to various variables.

In addition, the piping vibration absorber apparatus having a vibration monitoring system according to the embodiment may accurately adjust the natural frequency through the cantilever-shaped elastic plate and the mass plate, thereby improving the effect of reducing vibration frequency components.

In addition, the piping vibration absorber apparatus having a vibration monitoring system according to the embodiment has the advantage of being very useful in power plants in commissioning or commercial operation as piping vibration is effectively reduced when vibration is transmitted to the piping by vibration of an external structure.

In addition, the piping vibration absorber apparatus having a vibration monitoring system according to the embodiment may be easily fastened to and separated from the piping so as to be installed on site only by fastening the piping vibration absorber apparatus on the pipe with the clamp and the bolt, and as the piping vibration absorber apparatus is installed along the axial direction of the piping, the piping vibration absorber apparatus does not require a separate installation space.

In addition, the piping vibration absorber apparatus having a vibration monitoring system according to the embodiment is installed only on the pipe itself without using external structures, and thus, it is easy to install the piping vibration absorber apparatus on-site and is advantageous to optimize piping design by not affecting piping thermal stress.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A piping vibration absorber apparatus having a vibration monitoring system to reduce vibration occurring in piping, the piping vibration absorber apparatus comprising a vibration absorber installed in the pipe, wherein the vibration absorber comprises:

an elastic plate having one side coupled to the pipe and formed in a cantilever shape;

a mass plate installed on the elastic plate and having a specified mass;

a wire damper including a steel wire and coupled to another side of the elastic plate; and a first clamp and a second clamp coupled to the pipe, wherein the one side of the elastic plate is coupled to the first clamp, and the wire damper is coupled to the second clamp, wherein the elastic plate comprises:

a fixing part coupled to the first clamp;

a second flat plate part extending from the fixing part and formed in a flat plate shape;

a first flat plate part to which the wire damper is coupled and formed in a flat plate shape; and a curvature part connecting the second flat plate part to the first flat plate part and extending while forming a curvature.

2. The piping vibration absorber apparatus of claim 1, wherein the first clamp comprises a first saddle to which the one side of the elastic plate is fixed, and the second clamp comprises a second saddle to which the steel wire of the wire damper is fixed.

3. The piping vibration absorber apparatus of claim 2, wherein the second saddle is provided with a wire fixing unit for fixing the steel wire, and a length of the steel wire extending from the wire fixing unit to the other side of the elastic plate is adjusted by adjusting a position where the steel wire is fixed to the wire fixing unit.

4. The piping vibration absorber apparatus according to claim 3, wherein the steel wire is formed in a U-shape and is coupled to the other side of the elastic plate and the wire fixing unit.

5. The piping vibration absorber apparatus of claim 1, wherein the curvature part comprises:

a first curvature part extending while forming a first curvature;

a second curvature part extending while forming a second curvature; and a connection part connecting the first curvature part to the second curvature part.

6. The piping vibration absorber apparatus of claim 1, wherein the vibration absorber comprises a reinforcing plate connecting the lower part of the second flat plate part to the first clamp, wherein the reinforcing plate has a curved shape.

7. The piping vibration absorber apparatus of claim 1, wherein the vibration absorber comprises a plurality of the elastic plates, and the vibration absorber comprises a vibration damping material provided in at least one of between the plurality of the elastic plates, on upper portions of the elastic plates and on lower portions of the elastic plates.

8. The piping vibration absorber apparatus according to claim 7, wherein the vibration damping material is provided between the plurality of first flat plate parts, the second flat plate parts, and the curvature parts and a spacer having a same thickness as the vibration damping material and higher strength than the vibration damping material is provided between the plurality of fixing parts.

9. The piping vibration absorber apparatus according to claim 1, wherein the vibration absorber is provided with a plurality of the mass plates, wherein the plurality of the mass plates are stacked on the elastic plate.

10. The piping vibration absorber apparatus according to claim 1, wherein the vibration absorber comprises an eye bolt and a nut for installing the mass plate on the elastic plate, wherein the eye bolt is provided with a ring.

11. The piping vibration absorber apparatus according to claim 1, wherein the vibration absorber includes an eye bolt and a nut for installing the mass plate on the elastic plate, the elastic plate has a slot extending in the longitudinal direction, and the eye bolt passes through the mass plate and is inserted into the slot.

12. The piping vibration absorber apparatus according to claim 1, wherein the vibration absorber comprises:

a vibration sensor installed on the elastic plate to measure vibration of the pipe; and a piezoelectric element installed on the elastic plate and connected to the vibration sensor to supply power to the vibration sensor.

13. The piping vibration absorber apparatus according to claim 12, further comprising a monitoring unit configured to receive data from the vibration sensor.

14. The piping vibration absorber apparatus according to claim 1, wherein a plurality of vibration absorbers are included.

15. The piping vibration absorber apparatus according to claim 14, wherein the plurality of vibration absorbers are arranged side by side around the pipe.

16. The piping vibration absorber apparatus according to claim 14, wherein the plurality of vibration absorbers are arranged on an upper portion and a lower portion of the pipe around the pipe.

* * * * *